United States Patent
Wang et al.

(10) Patent No.: US 6,627,104 B1
(45) Date of Patent: Sep. 30, 2003

(54) MECHANOCHEMICAL FABRICATION OF ELECTROCERAMICS

(75) Inventors: John Wang, Singapore (SG); Dongmei Wan, Singapore (SG); Junmin Xue, Singapore (SG)

(73) Assignee: The National University of Singapore, Singapore (SG)

( * ) Notice: Subject to any disclaimer, the term of this patent is extended or adjusted under 35 U.S.C. 154(b) by 0 days.

(21) Appl. No.: 09/720,792

(22) PCT Filed: Jun. 26, 1999

(86) PCT No.: PCT/SG99/00062
§ 371 (c)(1),
(2), (4) Date: Mar. 26, 2001

(87) PCT Pub. No.: WO00/01635
PCT Pub. Date: Jan. 13, 2000

(30) Foreign Application Priority Data

Jul. 1, 1998 (SG) ............................... 9801566

(51) Int. Cl.⁷ .................. C04B 35/26; C04B 35/462; C04B 35/48; C04B 35/49
(52) U.S. Cl. ..................... 252/62.9 PZ; 252/69.9 R
(58) Field of Search ....................... 252/62.9 R, 62.9 PZ (56) References Cited

U.S. PATENT DOCUMENTS

| | | | | |
|---|---|---|---|---|
| 3,856,693 A | * | 12/1974 | Kim ..................... | 252/62.9 PZ |
| 3,890,241 A | * | 6/1975 | Nishida et al. ........ | 252/62.9 PZ |
| 4,142,124 A | * | 2/1979 | Ogawa et al. ......... | 252/62.9 PZ |
| 4,210,546 A | * | 7/1980 | Ouchi et al. .......... | 252/62.9 PZ |
| 4,283,228 A | | 8/1981 | Buchanan et al. | |
| 5,272,132 A | | 12/1993 | Gyorgy et al. | |
| 5,433,917 A | | 7/1995 | Srivastava et al. | |
| 5,753,136 A | * | 5/1998 | Tani et al. ............ | 252/62.9 PZ |
| 6,136,229 A | * | 10/2000 | Cui et al. ................ | 252/518.1 |

FOREIGN PATENT DOCUMENTS

| | | |
|---|---|---|
| JP | 4-215204 | 8/1992 |
| JP | 4-320302 | 11/1992 |

OTHER PUBLICATIONS

"Formation and characterization of lead magnesium niobate synthesized from the molten salt of potassium chloride", D.M. Wan et al., Journal of Alloys and Compounds 274 (1998) pp. 110–117, No month.

* cited by examiner

Primary Examiner—Elizabeth D. Wood
(74) Attorney, Agent, or Firm—Birch, Stewart, Kolasch & Birch, LLP (57) ABSTRACT

Mechanochemical fabrication produces electroceramics using oxides as starting materials. The fabrication starts with mixing industrial ceramic oxide powders. Electroceramic phases are formed by reacting the oxide powders in a mechanochemical chamber, which is a wear-resistant cylindrical vial with one or more solid balls inside. The formation of electroceramic phases of pervoskite structure and fine crystallinity are activated by mechanical energy or a combination of mechanical energy and thermal energy. Sintered electroceramic materials and components are fabricated when compacts or green bodies made of the resulting ceramic powders are densified at the sintering temperature. The technique can fabricate a wide range of PbO-based ceramics such as $Pb(Mg_{1/3}Nb_{2/3})O_3$ (PMN), $Pb(Mg_{1/3}Nb_{2/3})O_3\text{-}PbTiO_3$ (PMN-PT), $Pb(Mg_{1/3}Nb_{2/3})O_3\text{-}Pb(Zn_{1/3}Nb_{2/3})O_3\text{-}PbTiO_3$ (PMN-PZN-PT), and other PMN-based relaxor ferroelectrics, $Pb(Zr_{1-x}Ti_x)O_3$ (PZT) and PZT-based piezoelectrics at sintering temperatures as low as 900° C.

13 Claims, 5 Drawing Sheets

MECHANOCHEMICAL FABRICATION OF ELECTROCERAMICS

This application is the national phase under 35 U.S.C. §371 of PCT International Application No. PCT/SG99/00062 which has an International filing date of Jun. 26, 1999, which designated the United States of America.

FIELD OF THE INVENTION

The invention relates to the fabrication of technologically demanding electroceramic materials, such as PbO-based relaxor ferroelectrics with the general formula of Pb(B'B")$O_3$, where B' is low valence cations such as $Mg^{2+}$, $Fe^{2+}$, $Zn^{2+}$, $Ni^{2+}$, $Co^{2+}$, $Mn^{2+}$, $Sc^{3+}$, $Al^{3+}$ and $In^{3+}$, and B" is high valence cations such as $Nb^{5+}$, $Ta^{5+}$ and $W^{6+}$, and piezoelectrics. The required electroceramic phases of perovskite structure are formed by mixing and reacting the constituent oxides in a mechanochemical reaction chamber. Intermediate compounds, such as pyrochlore phases, may or may not be involved in the mechanochemical synthesis. The loss of volatile components, such as lead (PbO), may be avoided as the reaction may be activated by mechanical energy or a combination of mechanical and thermal energies at room temperature or a temperature considerably lower than the calcination temperature in the conventional ceramic processing routes. Sintered electroceramics are fabricated by directly shaping and sintering the resulting electroceramic powders, while all the phase-forming and powder milling steps prior to sintering are preferably omitted. The mechanochemical processing technique of the invention has been used to produce: (a) electroceramic powders of nanometer to micrometer in size, without having to pre-react the starting oxides or nonoxides at an intermediate temperature which is almost always involved in synthesizing the ceramic powders via other fabrication routes (e.g. Columbite method); and (b) sintered electroceramics at much lower sintering temperatures than those required by all the currently used industrial processes.

BACKGROUND OF THE INVENTION

Electroceramics, such as lead oxide-based relaxor ferroelectrics (e.g. PMN, PMN-PT, and PMN-PZN-PT) and piezoelectrics (e.g. PZT and PLZT) are functional materials indispensable in almost all the electronic and microelectronic devices. They exhibit a perovskite structure and demonstrate unique dielectric, piezoelectric and ferroelectric properties, depending on the type and composition of phases retained in the sintered ceramic form. For example, PMN-based relaxor ferroelectrics are characterized by a very high dielectric constant (>15,000) and broad maxima, together with a high electrostriction coefficient. PZT exhibits some of the most desirable piezoelectric properties required in the applications such as transducers, mechanoelectrical sensors and actuators.

Each of these electroceramic materials can be fabricated via several processing routes, although the suitability of these techniques and the microstructure and properties of resulting electroceramics vary considerably from one to another. Using PMN-based relaxor ferroelectrics as example, there are at least four types of very different fabrication routes: (i) Conventional ceramic processing technique, which involves mixing of the starting oxide constituents and reacting them together by a calcination treatment at intermediate temperatures in the range of 700 to 1000° C., followed by milling of the pre-reacted ceramic phases prior to shape forming and sintering at a high enough temperature. See, for example, M. Lejeune and J. P. Boilot, Ceramics International, Vol. 8, 1982, pp.99–103; (ii) Columbite method which is a modification of the conventional mixed oxide method whereby the constituent MgO and $Nb_2O_5$ are first mixed and reacted together to form the columbite phase prior to mixing and reacting with PbO. See, for example. S. L. Swartz and T. R. Shrout, Materials Research Bulletin, Vol. 17 (1982) pp.1245–1250. Similarly, the perovskite PMN phase may also be synthesized by pre-reacting PbO and $Nb_2O_5$ before MgO is mixed and reacted in. See, for example, J. P. Guha and H. U. Anderson. Journal of American Ceramic Society, Vol. 69, 1986, pp.c-287–288. Both of the two processes inevitably involves multiple calcination and milling steps, before a PMN ceramic can be made by consolidating the resulting electroceramic powder of perovskite structure at the sintering temperature; (iii) Wet chemistry routes, where a PMN precursor is first synthesized via one of the many wet chemistry-based routes such as co-precipitation, sol-gel routes, citrate, oxalate and partial oxalate methods. Perovskite ceramic phase is then formed by calcining the resulting chemical precursor at an intermediate temperature, prior to shape forming and sintering at a high enough temperature. See, for examples, F. Chaput, J. P. Boilot, M. Lejeune, R Papiernik and L. Hubert-Pfalzgraf, Journal of American Ceramic Society, Vol. 72, 1989, pp.1355–1357; Y. Yoshikawa and K. Uchino, Journal of American Ceramic Society, Vol. 79,1996, pp.2417–2421; A. Watanabe, H. Haneda, Y. Moriyoshi, S. Shirasaki, S. Kuramoto and H. Yamamura, Journal of Materials Science, Vol. 27, 1992, pp.1245–1249; J. C. Ho, K. S. Liu and I. N. Lin, Journal of Materials Science, Vol. 30, 1995, pp.3936–3943; and (iv) molten salt method, in which the required perovskite PMN phase is synthesized by reacting the constituent oxides in a molten medium of low melting point, such as KCl, NaCl and PbO. See, for examples, K. Katayana, M. Abe and T. Akiba, Ceramics International, Vol. 15, 1989, pp.289–295; H. M. Jang, S. H. Oh and J. H. Moon, Journal of American Ceramic Society, Vol. 75, 1992, pp.82–88. These four types of processing route for PMN are considerably different in many aspects, including the types of starting material required and the ability to deliver a sintering-reactive PMN powder of perovskite phase and therefore in the microstructure and electrical properties of sintered PN. Most of the wet chemistry-based processing routes use high purity inorganic or organometallic chemicals, such as nitrates, chlorides and alkoxides, as the starting materials. They are many times mole expensive than the industrial ceramic oxide powders and many of these chemicals are highly sensitive to moisture and therefore are difficult to handle in a large production scale for industrial applications. Furthermore, almost all these wet chemistry-based processing routes are very low in production yield and most of them have yet demonstrated any significant advantages than the conventional ceramic processing route.

In contrast, the conventional mixed oxide route involves mixing and calcining oxide powders at an intermediate temperature and subsequently milling the pre-reacted electroceramic phase, although inexpensive oxides are used as the starting materials. Its application is, however, limited by the inevitable occurrence of pyrochlore phases (e.g. $Pb_3Nb_4O_{13}$, $Pb_3Nb_2O_8$, and $Pb_2Nb_2O_7$) in the pre-reacted PMN powders and it is impossible to eliminate them from the sintered electroceramic. This has effectively made the conventional mixed oxide route inapplicable in fabricating PbO-based relaxor ferroelectrics. The Columbite method, which has been dominating the fabrication of PMN and PMN-based relaxor ferroelectrics over the last 15 years since its discovery in 1982 by S. L. Swartz and T. R. Shrout, see Materials Research Bulletin, Vol. 17 (1982) pp.1245–1250, is able to deliver a PMN powder of predominant perovskite phase. However, it is associated with such fetal disadvantages as the multiple calcination and milling steps required, which cause contamination to the electroceramics and significantly degrade their electrical properties. As pointed out by A. J. Moulson and J. M. Herbert (Electroceramics, Chapman and Hall, London, 1990), contamination in the level of 0.1 to 2 wt % is common under normal milling conditions. This is not acceptable for most of the electroceramic materials. As a result of the poor powder characteristics, a sintering temperature in the range of 1200 to 1350° C. is needed for the Columbite-derived PMN powders. As has been demonstrated recently by D. M. Wan, J. Wang, L. M. Gan and S. C. Ng (accepted for publication in Journal of Alloys and Compounds, 1998, in press), molten salt method is not suitable for producing high-purity PNN, as a result of the contamination by either the flux or excess PbO required for forming the perovskite phase.

Two of the primary objectives in developing PMN and PMN-based electroceramic materials over the last two or three decades are: (i) lowering their sintering temperatures; and (ii) eliminating as much pyrochlore phase as possible in both pre-reacted powder state and sintered ceramic. Unfortunately none of the two objectives has been successfully achieved, although huge efforts have been devoted in taking the following two general approaches: (a) synthesizing a fine and sintering-reactive powder of perovskite phase as the starting material for fabrication of sintered PMN at a lowered sintering temperature; and (b) incorporating an effective dopant or sintering additive to both stabilize the perovskite structure and at the same time to improve the sinterability. The first approach has been practiced by adopting various wet chemistry-based processing routes as mentioned earlier and has not led to anything practically useful for the electroceramic industry. The second approach looks attractive, and however, it has not materialized anything significant to the two primary objectives.

A similar summary as that of PMN can be made for the development of PZT-based piezoelectrics over the last twenty or thirty years. It is difficult to fabricate a PZT ceramic with density close to the theoretical value, via the conventional mixed oxide route, without use of the sintering additives such as $V_2O_5$, $Bi_2O_3$, and eutectic mixtures of CuO and BaO or SrO as claimed by Buchanan and Wittmer in U.S. Pat. No. 4,283,228 (1981) and Srivastava, Bhalla and Cross in U.S. Pat. No. 5,433,917 (1995), respectively. The various attempts via wet chemistry-based processing routes over the last twenty years led to little improvement in the fabrication of electroceramics and in most cases have failed. This is evidenced by the fact that none of these chemistry routes have yet been adopted by the electroceramic industry for the manufacture of PMN-based based relaxors and PZT-based piezoelectrics. The conventionally processed electroceramic powders exhibit a very high sintering temperature, which has failed the primary objective in lowering the sintering temperature for uses in multilayer devices (e.g. MLCs).

In the newly invented mechanochemical fabrication technique, widely available and low cost oxide powders may be employed as the starting materials. Electroceramic powders of perovskite structure, such as PMN, PMN-PZN-PT and PZT, may be synthesized at room temperature by mechanical activation, instead of one or more calcination treatments at intermediate temperatures. Pyrochlore phases, which occur in the PMN and PMN-based relaxors synthesized via almost all other processing routes, may advantageously be completely eliminated from the mechanochemically synthesized powders. The resulting electroceramic powders are nanometer in size and almost agglomeration-free and sintered electroceramics may be fabricated at a much lower sintering temperature than that required in currently used industry processes. This will lead to a revolutionized change in the entire electroceramic industry, while all the intermediate calcination and milling steps are omitted. Accordingly, the uses of electroceramic materials in co-firable mulitlayer electronic and microelectronic devices will advantageously be widened by substantially reducing the production cost when the very expensive electrodes, such as platinum and palladium, are replaced by much cheaper ones, as a result of the lowered sintering temperature.

SUMMARY OF THE INVENTION

A fabrication technique is provided for the manufacture of PbO-based electroceramic materials, including, for example, PbO-based relaxor ferroelectrics (e.g. PMN, PMN-PT, PMN-PZN-PT) and PbO-based piezoelectrics (PZT). The technique advantageously uses low-cost oxide powders as the starting materials, and designed electroceramic phases of perovskite structure are synthesized by mechanical activation or a combination of mechanical and thermal activations at room temperature or a temperature above or below room temperature in a mechanical activation chamber, instead of conventional calcination at an elevated temperature.

According to the present invention there is provided a method for producing a PbO-based electroceramic material in powder form from its constituent oxides, the method comprising the steps of:

mixing constituent oxides, including Pbo, in an appropriate ratio as required by the electroceramic material; and forming an electroceramic powder of perovskite structure and particle size in the range of 5 to 65 nm by mechanical activation at room temperature or a combination of mechanical and thermal activations of the mixed oxides, wherein the mechanical activation is produced by shaking the activation chamber with one or more stainless steel balls inside at a frequency of up to 3000 cycles per minute.

The present invention also provides an electroceramic material in powder form produced by a method as described in the immediately preceding paragraph.

The present invention further provides a sintered electroceramic material by shaping and subsequent sintering of the electroceramic powder produced by mechanical activation.

The present invention details a mechanochemical fabrication technique for electroceramic materials such as PbO-based relaxor ferroelectrics with the general formula of $Pb(B'B")O_3$ (e.g. PMN, PMN-PT, PMN-PZN-PT), where B' is low valence cations such as $Mg^{2+}$, $Fe^{2+}$, $Zn^{2+}$, $Ni^{2+}$, $Co^{2+}$, $Mn^{2+}$, $Sc^{3+}$, $Al^{3+}$ and $In^{3+}$, and B" is high valence cations such as $Nb^{5+}$, $Ta^{5+}$ and $W^{6+}$, and/or piezoelectrics with the general formula of $Pb(Zr_{1-x}Ti_x)O_3$ (x varies from 0 to 1.0) with or without minor sintering additives. It starts with mixing of the constituent oxides, preferably in the form of a powder having particles of nanometers to tens of micrometers in size, at the required molar ratio for a given electroceramic composition preferably by ball milling in ethanol or any other aqueous or non-aqueous solvents using zirconia or any other balls as the milling media. To achieve mixing, the weight ratio of oxide powders:solvent:balls is controlled preferably at 1:1:2 and milling time is adjusted preferably in the range of 0.5 to 50 hours.

The ball milled slurry is preferably then dried at ~80° C. for a few hours to drive off the solvent and the as-dried powder mixture is then ready for mechanochemical reaction preferably in a high energy mechanochemical reaction chamber. The reaction chamber preferably consists of a wear-resistant cylindrical vial having one or more solid balls inside. The required electroceramic phase is preferably synthesized at room temperature, but may also be synthesized at a temperature above or below room temperature, for example from 0° C. to 500° C. when the oxide mixture is subjected to the mechanical activation or combination of mechanical and thermal activations. The mechanical activation or combination of mechanical and thermal activations are preferably generated via one or more types of impact, shear, fracture, high local pressure and temperature at or near the collision points between powder particle and powder particle and those between powder particles and the solid ball(s) or vial walls. This may be performed by shaking the oxide powder mixture together with the one or more solid balls in the wear-resistant vial in one or more directions at a frequency up to 50 cycles per second. The mechanochemical synthesis can be completed in a time period ranging from a few minutes to tens of hours, depending on the type of electroceramic material. It can be easily scaled up to kg batch or more for industry applications by varying the type and dimensions of mechanochemical reaction chamber and solid balls.

The resulting electroceramic powders preferably consist of nanometer to micrometer sized particles and are rounded in particle morphology, and exhibit a minimal degree of particle agglomeration. In one embodiment, the particles are then compacted into pellets in a steel die of 10 mm in diameter at a pressure in the range of 20 to 200 MPa, resulting in a green density in the range of 50 to 60% theoretical. Other component shapes of electroceramic may easily be fabricated by employing the commonly available ceramic forming techniques, such as uniaxial or isostatic pressing, plastic forming (extrusion and injection molding), and casting (slip casting and tape casting) or a combination of these. To further improve their green densities, the powder pellets or components may be subjected to an isostatic pressing: at a pressure of up to 500 Mpa.

The sintering of the shaped electroceramic powder is preferably conducted at a temperature in the range of 800 to 1400° C., depending on the type and composition of electroceramic phases involved.

The electroceramic materials produced may include both fine electroceramic powders and sintered relaxor ferroelectrics and/or piezoelectrics of PbO-based perovskite structure, the fine electroceramic particles being produced by the mixing and mechanochemical reaction of the constituent oxides, and the sintered electroceramics being fabricated by the subsequent shaping and sintering of the powders.

The mechanochemically synthesized electroceramic powders are advantageously of pure or predominant perovskite phase. These are advantageously not calcined at an intermediate temperature prior to shape forming and sintering and therefore the conventional post-calcination milling step is also advantageously eliminated. The electroceramic powders prepared using the mechanochemical technique exhibit a high specific surface area (typically in the range of 5 to 50 $m^2/g$) and are generally nanometer to micrometer in size and are almost agglomeration-free. As such they may be sintered at a much lower temperature than that required by the powders prepared via either the conventional ceramic processing routeror the Columbite route. In particular, PMN, PMN-based relaxor ferroelectrics and PZT may be fabricated at a sintering temperature as low as 800° C.

The present invention is advantageously applicable to the entire relaxor and piezoelectric families, as has been demonstrated to provide PMN, PMN-PZN-PT and PZT having excellent electrical properties. Level of contamination of the materials may be further minimized by a proper selection and combination of the types and dimensions of mechanochemical reaction chamber and activation medium. Property-degrading phases, such as the pyrochlores, are advantageously absent from the resulting electroceramic powders although they may or may not be involved in the mechanochemical synthesis process. Using the newly invented mechanochemical technique, sintered electroceramic materials and components can be manufactured directly from widely available oxide powders by following the much simplified "mixing/reacting-shape forming-sintering" route.

BRIEF DESCRIPTION OF THE DRAWINGS

A more detailed description of the invention will now be described with reference to the accompanying drawings.

EXAMPLE 1

$Pb(Mg_{1/3}Nb_{2/3})O_3$ POWDER AND SINTERED PMN

Figure 1:
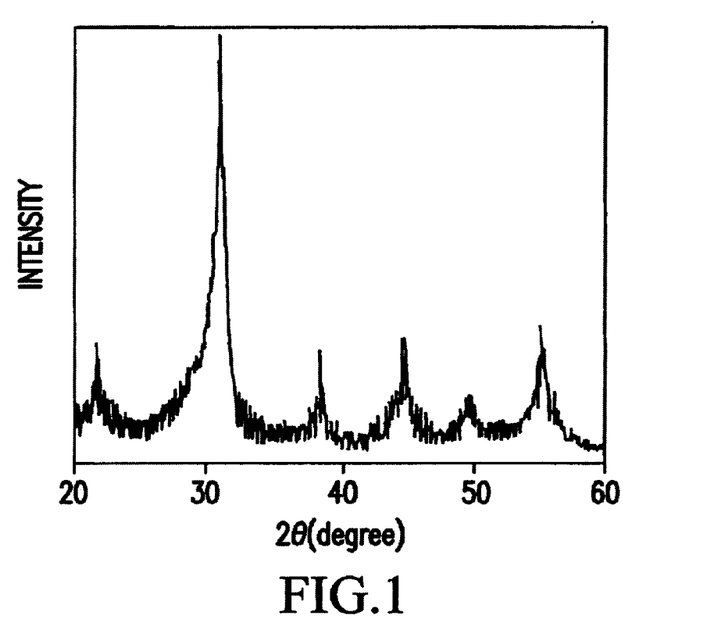
FIG. 1 is the XRD pattern for the PMN powder mechanochemically reacted for 15 hours indicating that it is a high purity perovskite compound.

The starting materials were commercially available PbO, MgO and $Nb_2O_5$ of reagent grade or high purity. These powders exhibit an average particle size in the range of submicron to tens of microns. To make a batch of 30 grams of $Pb(Mg_{1/3}Nb_{2/3})O_3$ powder, 20.58 grams of PbO, 1.24 grams of MgO and 8.18 grams of Nb2O5 were weighed out and placed in a laboratory ball mill, together with 30 grams of ethanol and 60 grams of zirconia balls of 5.0 mm in diameter. The three oxide powders were milled together for 48 hours, followed by drying the slurry at ~80° C. using a heating lamp. The as-dried powder mixture was ground using an agate mortar and pestle in order to eliminate large powder lumps and was then passed through 40 mesh sieves. Phase analysis using X-ray diffraction indicated that no reaction among the constituent oxides had taken place in the resulting powder mixture. 6 grams of the powder mixture was then loaded a cylindrical vial of 40 mm in diameter and 40 mm in length together with a solid ball of 12.7 mm in diameter. Mechanochemical synthesis was carried out by shaking the cylindrical vial using a shaker-mill operated at ~900 rpm for various time periods ranging from 0 to 25 hours. The solid state reaction among constituent oxides was activated by the mechanical interactions between powder particle and powder particle and those between powder particles and solid balls or vial wall. This involved the impact, shear, fracture, and pressure or temperature-assisted reaction processes at the collision points. Formation of the desired perovskite phase was completed via a nucleation and subsequent growth of crystallites, from the highly activated powder mixture. The resulting powders were characterized for phases present using a X-ray diffractometer, particle size and specific surface area analyzers. As shown in FIG. 1, the powder mechanochemically reacted for 15 hours consists of fine perovskite PMN crystallites. No any other phases are observed, indicating that the formation of perovskite phase is completed and level of impurities is minimal if any. The powders reacted for more than 15 hours, up to 25 hours, demonstrate a similar XRD trace. A specific surface area of 12.0, 18.9 and 20.1 $m^2/g$, corresponding to an average particle size of 61, 39 and 37 nm, was measured for the powders mechanochemically reacted for 15, 20 and 25 hours, respectively. Their average agglomerate sizes are 0.19, 0.19 and 0.18 $\mu$m, respectively, as measured using laser scattering technique. Intermediate pyrochlore phases were not observed in these powders prior to the formation of perovskite phase.

Figure 2:
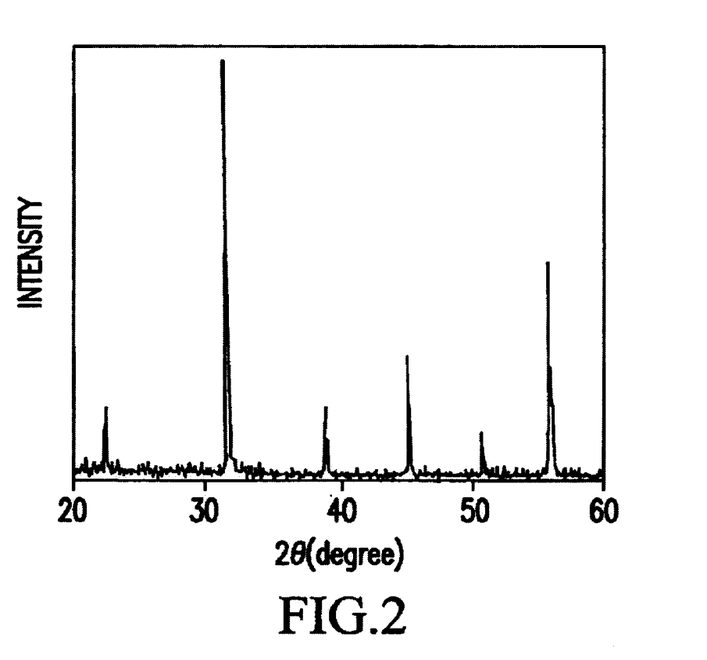
FIG. 2 is the XRD pattern for the PMN ceramic sintered at 1050° C. for 1 hour, showing that pyrochlore phase is absent from the sintered electroceramic.

The mechanochemically synthesized PMN powder at 20 hours was uniaxially pressed into pellets in a hardened steel die of 10 mm in diameter at a pressure of 50 MPa, resulting in a green density of 58% theoretical (8.13 $g/cm^3$ was taken as the theoretical density). They were subsequently subjected to an isostatic pressing at 350 MPa and then sintered in a covered alumina crucible at various temperatures in the range of 900 to 1100° C. for 1.0 hour, with both heating and cooling rates being fixed at 5.0° C./minute. This resulted in a one dimensional shrinkage in the range of 10 to 15%, depending on the sintering temperature. A sintered density of 7.21, 7.66, 7.98, 8.05 and 8.01 $g/cm^3$ was obtained for the PMN sintered 900, 950, 1000, 1050 and 1100° C. for 1.0 hour, respectively. They correspond to a relative density of 88.68, 94.22, 98.15, 99.02 and 98.52% theoretical, respectively. Microstructural characterization using scanning electron microscope supported the fact that the sintered density increases with increasing temperature from 900 to 1050. A dense and uniform fracture surface with average grain size in the range of 6 to 8 $\mu$m was observed for PMN sintered at 1050° C. for 1.0 hour, the XRD of which is shown in FIG. 2. It clearly demonstrates that the sintered ceramic is a high purity PMN and no any impurity phases are observed.

Figure 3:
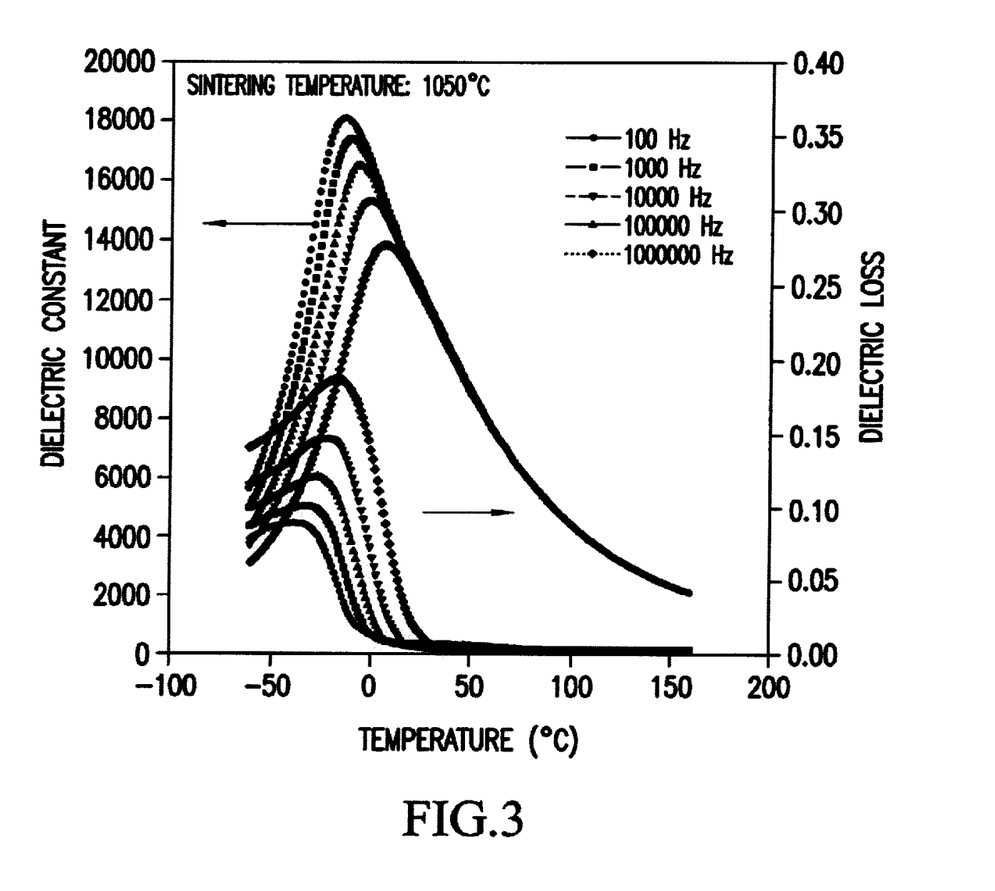
FIG. 3 shows the dielectric properties as a function of temperature at various frequencies for PMN sintered at 1050° C. for 1 hour. The high purity is clearly shown by the excellent dielectric properties.

FIG. 3 illustrates the dielectric constant and dielectric loss as a function of temperature over the range from −60 to 160° C. at various frequencies for the PMN sintered at 1050° C. for 1.0 hour, as measured using a HP 4284A LCR meter. As expected, the dielectric properties of mechanochemically synthesized PMN are dependent on the sintered density, which is controlled by the sintering temperature. The materials sintered at 900, 950, 1000, 1050 and 1100° C. for 1.0 hour exhibit a maximum dielectric constant ($\epsilon_{max}$) of 3331, 13301, 14550, 18083 and 17540, respectively, at 100 Hz. The materials sintered at 950, 1000, 1050 and 1100° C. for 1.0 hour exhibit a room temperature dielectric constant ($\epsilon_{rm}$) of 9920, 11230, 12714 and 12185, together with a room temperature dielectric loss (tan$\delta$%) of 0.8, 0.9, 1.4 and 1, respectively, at 100 Hz. These dielectric properties demonstrate the fact that the novel mechanochemical fabrication technique is perfectly suitable for the manufacture of PbO-based relaxor ferroelectrics. Again, the high dielectric constants observed show that the mechanochemically synthesized PMNs are of high purity and the level of contamination is minimal.

EXAMPLE 2

0.9[0.4Pb($Mg_{1/3}Nb_{2/3}$)$O_3$-0.6 Pb($Zn_{1/3}Nb_{2/3}$)$O_3$]-0.1PbTi$O_3$ POW AND SINTERED 0.9(0.4PMN-0.6PZN)-0.1PT

Figure 4:
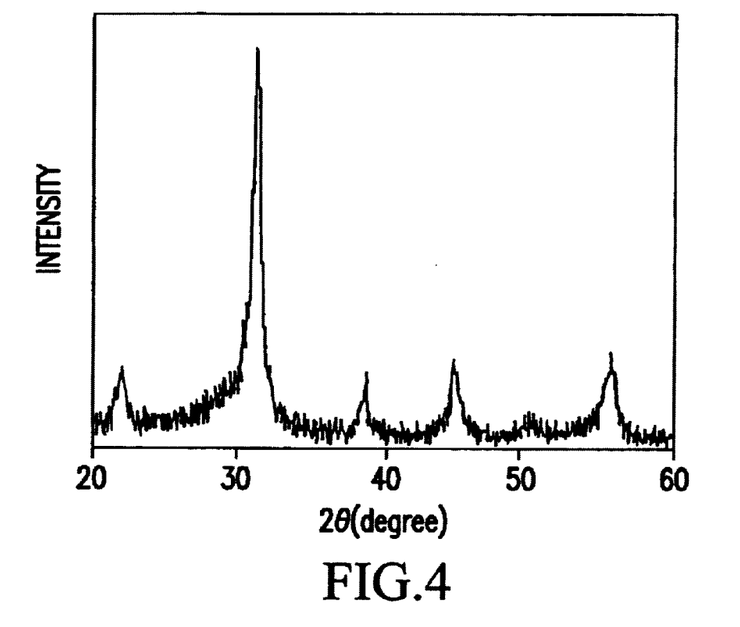
FIG. 4 is the XRD pattern for the 0.9(0.4PMN-0.6PZN)-0.1PT powder mechanochemically reacted for 10 hours, indicating that it is a high purity perovskite PMN-PZN-PT phase.
Figure 5:
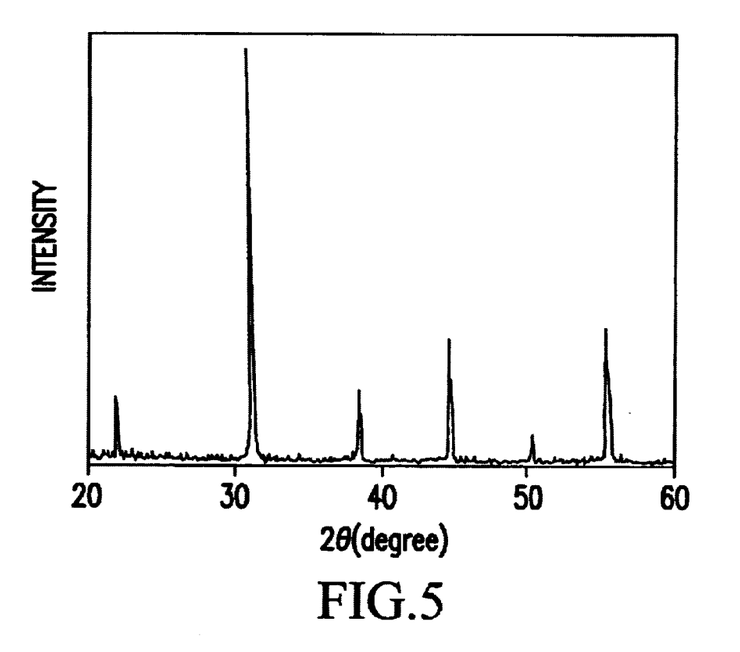
FIG. 5 is the XRD pattern for the 0.9(0.4PMN-0.6PZN)-0.1PT ceramic sintered at 1000° C. for 1 hour, showing that pyrochlore phase is absent from the sintered electroceramic.
Figure 6:
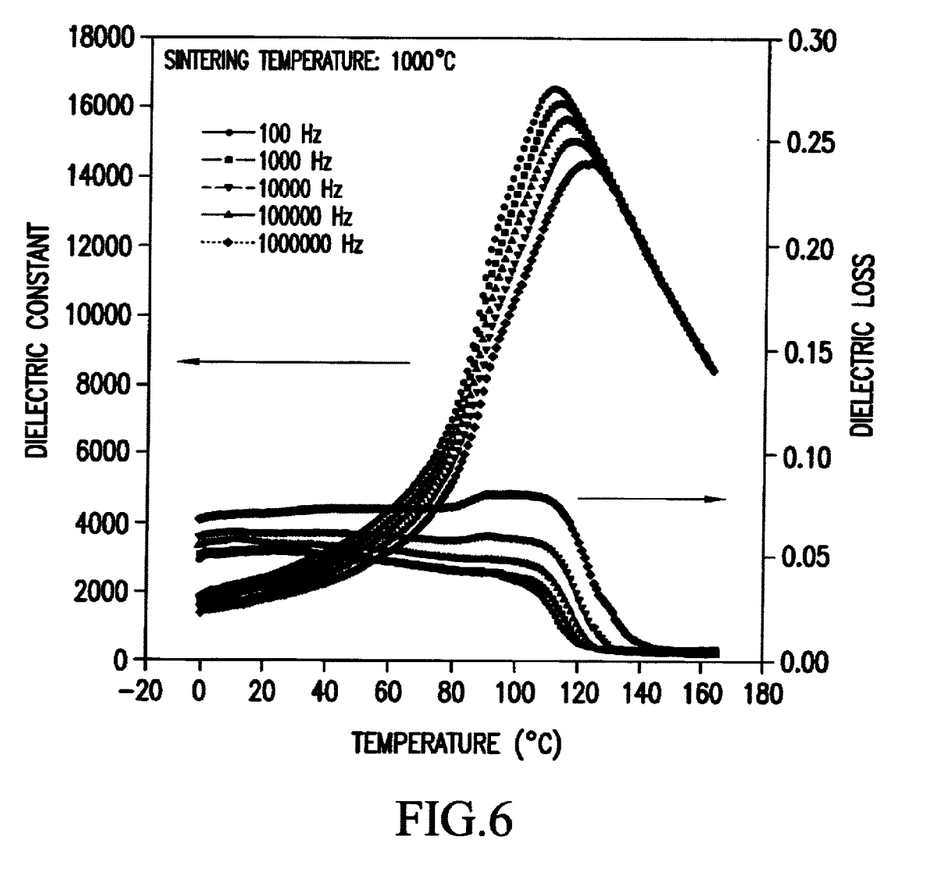
FIG. 6 shows the dielectric properties as a function of temperature at various frequencies for PMN-PZN-PT sintered at 1000° C. for 1 hour. The excellent dielectric properties indicate that the material is of high purity.

The starting materials were commercially available PbO, MgO and $Nb_2O_5$, ZnO and $TiO_2$ powders of reagent grade or high purity. Mixing of these oxide powders at an appropriate molar ratio as required for 0.9(0.4PMN-0.6PZN)-0.1PT composition in ball mill and the subsequent mechanochemical synthesis were carried out by following the procedure detailed in example 1. FIG. 4 is a XRD trace for the powder mechanochemically synthesized at 10 hours, showing that it consists of fine perovskite PMN-PZN-PT crystallites. Perovskite phase is the only phase detected by X-ray diffraction, indicating that the powder is of high purity. It exhibits a specific surface area of 11.3 $m^2/g$., corresponding to an average particle size of 65 nm. together with an average agglomerate size of 0.33 $\mu$m as measured using laser scattering technique. The powder is compacted into pellets in a hardened steel die of 10 mm in diameter at a pressure of 50 MPa, prior to be compacted in an isostatic press at 350 MPa, resulting in a green density of ~65% theoretical. They were then sintered at various temperatures in the range of 930 to 1100° C. for 1.0 hour in a covered alumina crucible. A sintered density of 7.82, 8.01, 8.05, 8.08 and 8.01 $g/cm^3$, corresponding to a relative density of 96.54, 98.89, 99.38, 99.75 and 98.89% theoretical, was obtained for the ceramic sintered at 930, 950, 1000, 1050 and 1100° C. for 1.0 hour, respectively. They exhibit a maximum dielectric constant ($\epsilon_{max}$) of 8515, 11270, 16500, 17267, 18580 and a room temperature dielectric constant ($\epsilon_{rm}$) of 2305, 2507, 2535, 2692 and 2851, together with a room temperature dielectric loss (tan$\delta$%) of 4.3, 4.7, 5.6, 5.4 and 4.5, respectively, at 100 Hz. Their Cuire temperatures decrease slightly (from 117 to 113° C.) with increasing sintering temperature from 930 to 1100° C. An average grain size in the range of 3 to 5 $\mu$m was observed using scanning electron microscope for the PMN-PZN-PT sintered at 1000° C. for 1.0 hour and XRD phase analysis indicates that it consists of perovskite phase of high purity, as shown in FIG. 5. Its dielectric properties (dielectric constant and dielectric loss) as a function of temperature are plotted in FIG. 6.

EXAMPLE 3

Pb($Zr_{0.52}Ti_{0.48}$)$O_3$ POWDER AND SINTERED PZT

Figure 7:
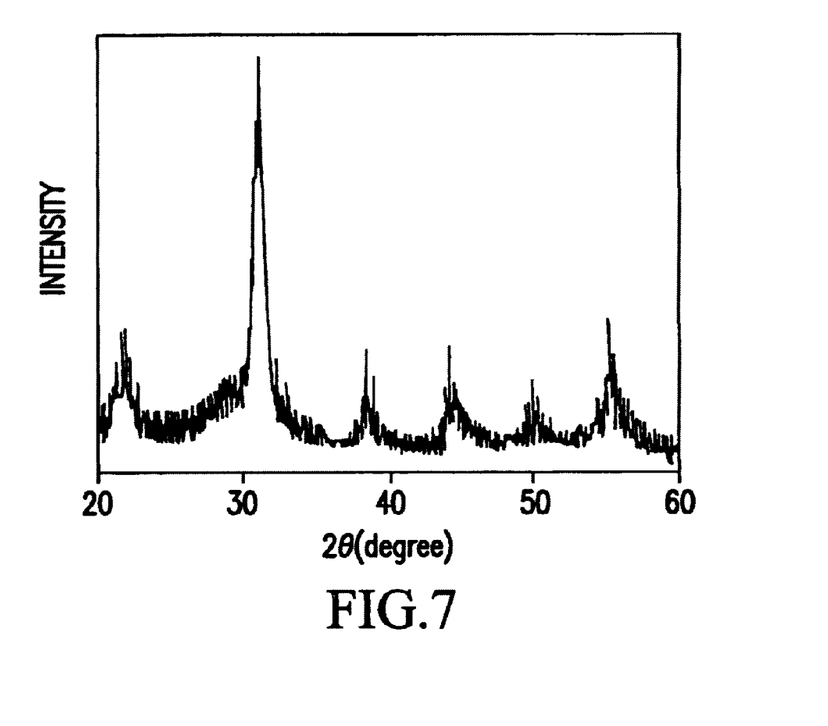
FIG. 7 is the XRD pattern for the PZT powder mechanochemically reacted for 15 hours, showing that it is a high purity PZT powder.

The starting materials were commercially available PbO, $ZrO_2$ and $TiO_2$ powders of reagent grade or high purity. Mixing and subsequent mechanochemical reaction of the three powders for Pb($Zr_{0.52}Ti_{0.48}$)$O_3$ were carried out by following the procedures detailed in sample 1. FIG. 7 is a XRD pattern for the powder reacted for 15 hours, indicating that it consists of fine perovskite PZT crystallites. Perovskite phase is the only phase detectable by X-ray diffraction. It exhibits a specific surface area of 14.6 m²/g, in comparison to 13.3 and 12.5 m²/g for the powders reacted for 20 and 25 hours, respectively. Their average agglomerate sizes are 0.20, 0.24 and 0.28 μm, respectively.

Figure 8:
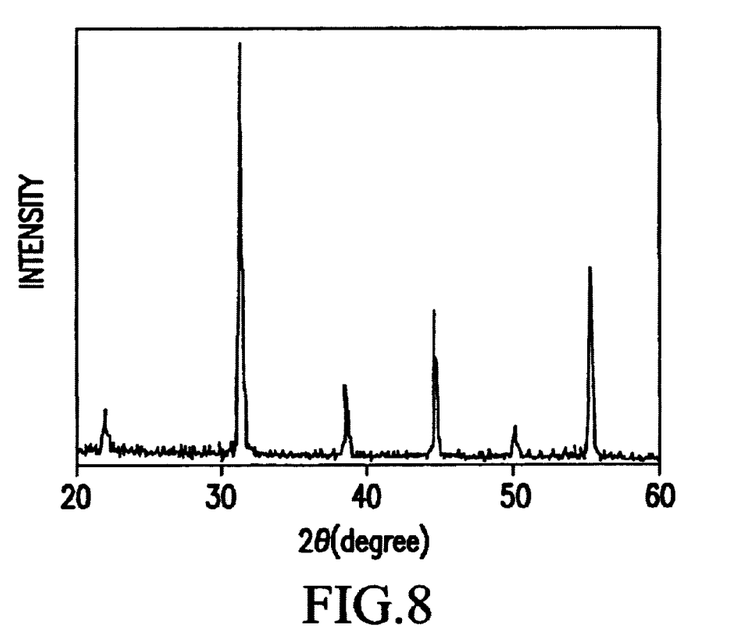
FIG. 8 is the XRD patter for the PZT ceramic sintered at 100° C. for 1 hour, indicating that it is a high purity PZT.

The PZT derived from the powder synthesized at 20 hours shows a sintered density of 7.44, 7.58, 7.73, 7.92 and 7.85 g/cm³, corresponding to a relative density of 93.00, 94.75, 96.63, 99.00 and 98.13% theoretical (8.00 g/cm³) when sintered at 950, 1000, 1050, 1100 and 1150° C., respectively. Their room temperature dielectric constant (m and dielectric loss (tanδ%) are 1090, 1129, 1196, 1340 and 1205, and 3.4, 2.1, 1.4, 0.6 and 0.7, respectively, when measured at 1.0 kHz. An average grain size in the range of 7 to 8 μm was observed for the PZT sintered at 1100° C. for 1.0 hour, the XRD trace of which is shown in FIG. 8. It demonstrates that the sintered ceramic is a high purity PZT of perovskite structure.

What is claimed is:

1. A method of producing a PbO-based electroceramic material which comprises:

mixing constituent oxides, including Pbo, in an appropriate ratio as required by the electroceramic material; and forming an electroceramic powder of perovskite structure by mechanical activation or a combination of mechanical and thermal activations of the mixed oxides, wherein the mechanical activation is produced by shaking an activation chamber having a wear-resistant vial with one or more stainless steel balls inside at a frequency in the range of up to 3000 cycles per minute, and the electroceramic material is in powdered form having a particle size in the range of 5 to 65 nm, and the PbO-based electroceramic material comprises a relaxor ferroelectric or piezoelectric.

2. The method according to claim 1, wherein the PbO-based electroceramic material is a powder having perovskite structure, wherein sintered electroceramic materials of perovskite structure are fabricated by shaping and subsequent sintering of the electroceramic powders.

3. The method according to claim 1, wherein the electroceramics are PbO-based relaxor ferroelectrics with the general formula of Pb'(B'B")O₃, where B' is a cation selected from the group consisting of $Mg^{2+}$, $Fe^{2+}$, $Zn^{2+}$, $Ni^{2+}$, $Co^{2+}$, $Mn^{2+}$, $Sc^{3+}Al^{3+}$, and $In^{3+}$, and B" is a cation selected from the group consisting of $Nb^{5+}$, $Ta^{5+}$ and $W^{6+}$, and/or piezoelectrics with the general formula of $Pb(Zr_{1-x}Ti_x)O_3$ (x varies from 0 to 1.0).

4. The method according to claim 1, wherein the mechanical activation of the mixed oxides is carried out in the activation chamber in the absence of any liquid phase.

5. The method according to claim 1, wherein the mechanical activation of the mixed oxides is carried out at a temperature of from 0° C. to 500° C.

6. The method according to claim 1, wherein the mechanical activation of the mixed oxides is carried out at room temperature.

7. The method according to claim 1, wherein the starting oxides are powdered materials with particle sizes in the range of from about 5 nanometers to about 100 micrometers.

8. The method according to claim 1 or claim 2, wherein the electroceramic powder consists of one or more perovskite phases with or without varying amount of other phases.

9. The method according to claim 2, wherein the shaping of the electroceramic powder comprises a method selected from the group consisting of pressing, plastic forming or casting the electroceramic powder or a combination of any of these.

10. The method according to claim 2, wherein the sintering is carried out at a temperature in the range of from 800 to 1400 ° C.

11. A PbO-based electroceramic powder of perovskite structure and PbO-based electroceramic materials in sintered bulk forms formed by the method according to claim 1 or claim 2.

12. The method according to claim 1 or claim 2, wherein the specific surface area of said electroceramic powders is in a range of about 5 to 50 m²/g.

13. The method according to claim 4, wherein the mechanical activation is performed for up to about 50 hours.

* * * * *

UNITED STATES PATENT AND TRADEMARK OFFICE
CERTIFICATE OF CORRECTION

PATENT NO. : 6,627,104 B1
DATED : September 30, 2003
INVENTOR(S) : John Wang, Dongmei Wan and Junmin Xue It is certified that error appears in the above-identified patent and that said Letters Patent is hereby corrected as shown below:

Column 6,
Line 64, change "Nb2O5" to -- $Nb_2O_5$ --

Column 7,
Line 55, change "1050" to -- 1050°C --

Column 8,
Line 19, change "POW" to -- POWDER --

Column 9,
Line 14, change "(m and dielectric" to -- ($\varepsilon_{nm}$) and dielectric --
Line 26, change "Pbo" to -- PbO --

Signed and Sealed this

Tenth Day of August, 2004

JON W. DUDAS
*Acting Director of the United States Patent and Trademark Office*

UNITED STATES PATENT AND TRADEMARK OFFICE
CERTIFICATE OF CORRECTION

PATENT NO.    : 6,627,104 B1
DATED         : September 30, 2003
INVENTOR(S)   : John Wang, Dongmei Wan and Junmin Xue It is certified that error appears in the above-identified patent and that said Letters Patent is hereby corrected as shown below:

Title page,
Item [57], ABSTRACT,
Lines 14-15, change "Pb(Mg$_{1/3}$Nb$_{2/3}$) O$_3$-PbTiO$_3$ (PMN-PT)", to -- Pb(Mg$_{1/3}$Nb$_{2/3}$)O$_3$-PbTiO$_3$ (PMN-PT) --
Lines 15-16, change "Pb(Mg$_{1/3}$Nb$_{2/3}$) O$_3$-Pb(Zn$_{1/3}$Nb$_{2/3}$O$_3$-PbTiO$_3$ (PMN-PZN-PT)" to -- Pb(Mg$_{1/3}$Nb$_{2/3}$)O$_3$-Pb(Zn$_{1/3}$Nb$_{2/3}$O$_3$-PbTiO$_3$, (PMN-PZN-PT) --

Column 2,
Line 5, change "Nb$_2$, O$_5$" to -- Nb$_2$O$_5$ --
Line 7, change "for example." to -- for example, --
Line 44, change "PN" to -- PMN --
Line 48, change "mole" to -- more --

Column 3,
Line 19, change "PNN" to -- PMN --

Column 4,
Line 37, change "Pbo" to -- PbO --

Column 6,
Line 3, change "routeror" to -- route or --
Line 20, change "mixing/reacting-shape forming-sintering" to -- mixing-reacting-shape forming-sintering --
Line 53, change "100°C" to -- 1100°C --
Line 64, change "Nb2O$_5$" to -- Nb$_2$O$_5$ --

Column 7,
Line 55, change "1050" to -- 1050°C --

Column 8,
Line 19, change "POW" to -- POWDER --

UNITED STATES PATENT AND TRADEMARK OFFICE
CERTIFICATE OF CORRECTION

PATENT NO.    : 6,627,104 B1
DATED         : September 30, 2003
INVENTOR(S)   : John Wang, Dongmei Wan and Junmin Xue It is certified that error appears in the above-identified patent and that said Letters Patent is hereby corrected as shown below:

Column 9,
Line 14, change "(m and dielectric" to -- ($\varepsilon_{nm}$) and dielectric --
Line 26, change "Pbo" to -- PbO --

This certificate supersedes Certificate of Correction issued August 10, 2004.

Signed and Sealed this

Twenty-fifth Day of January, 2005

JON W. DUDAS
*Director of the United States Patent and Trademark Office*